United States Patent [19]

Faroughy

[11] Patent Number: 5,033,829

[45] Date of Patent: Jul. 23, 1991

[54] OVERLAPPING POLARIZER PANELS CAPABLE OF GENERATING LIGHT AND DARK AND COLORED PATTERNS

[76] Inventor: Dara Faroughy, c/o 1923 Las Gallinas Av., San Rafael, Calif. 94903

[21] Appl. No.: 480,265

[22] Filed: Feb. 15, 1990

[51] Int. Cl.⁵ .................... G02B 5/30; G02B 27/28; G02F 1/01

[52] U.S. Cl. .................... 350/396; 350/404; 350/407

[58] Field of Search ............... 350/396, 404, 407, 408, 350/314

[56] References Cited

U.S. PATENT DOCUMENTS

| | | | |
|---|---|---|---|
| 1,676,760 | 7/1928 | Wilson | 350/314 |
| 2,174,270 | 9/1939 | Land | 350/404 |
| 2,473,857 | 6/1949 | Burchell | 350/404 |
| 2,773,422 | 12/1956 | Flynn, Sr. et al. | 350/407 |
| 2,789,462 | 4/1957 | Forgrave | 350/407 |
| 2,882,631 | 4/1959 | Boone | 350/404 |
| 2,977,845 | 4/1961 | Boone | 350/404 |
| 3,049,051 | 8/1962 | Debrie | 350/408 |
| 3,089,802 | 5/1963 | Coffman et al. | 350/404 |
| 3,218,919 | 11/1965 | Sturner et al. | 350/404 |
| 3,370,111 | 2/1968 | Boone | 350/396 |
| 3,814,506 | 6/1974 | Steele | 350/272 |
| 3,897,136 | 7/1975 | Bryngdahl | 350/404 |
| 3,936,147 | 2/1976 | Murakami | 350/407 |
| 4,123,141 | 10/1978 | Schuler | 350/407 |
| 4,285,577 | 8/1981 | Schuler | 350/407 |
| 4,286,843 | 9/1981 | Reytblatt | 350/396 |
| 4,902,112 | 2/1990 | Lowe | 350/396 |

FOREIGN PATENT DOCUMENTS 475049  7/1951  Canada ..................... 350/396

*Primary Examiner*—Rodney B. Bovernick
*Assistant Examiner*—Martin Lerner

[57] ABSTRACT

Sheets of certain transparent plastic materials placed between polarizer sheets have the ability to change substantially the light intensity emerging out of the polarizers without inducing colors (achromatic filters). Likewise, certain other plastic sheets have the ability to induce colors when oriented suitably between polarizer sheets. This invention uses this information to make panels that could serve as the basis for making optical light screening items like windows, blinds and other utility items that are capable of generating light and dark and colored patterns. The essential optical components of these items include: overlapping polarizer sheets capable of translation with respect to each others, a series of predesigned achromatic plastic filters, suitably placed between the polarizers, and, one or more color inducing plastic sheets placed also suitably between the polarizers.

2 Claims, 3 Drawing Sheets

OVERLAPPING POLARIZER PANELS CAPABLE OF GENERATING LIGHT AND DARK AND COLORED PATTERNS

FIELD OF THE INVENTION

This invention relates to new types of multi colored multi patterned light screening optical panels for windows, blinds, art glasses and other utility items that achieve screening and colors by means of polarizers and transparent plastic filters.

PRIOR ART

The emerging light intensity from two overlapping polarizers can be varied uniformly by simple rotation of the polarizers. Maximum light transmission occurs when the relative angle between the molecular orientations of the two polarizers is zero. Likewise, minimum transmission occurs when the relative angle is 90 degrees. This feature has been exploited for many decades in numerous prior art items which use polarizers.

Simple rotation of polarizers is, however, not convenient in light screening items that do not have round or near round geometries. In U.S. patent application Ser. No. 07/331871, now abandoned entitled "UNIFORM AND DISCRETE DARKENING OF VARIABLE TRANSMISSIVITY WINDOWS", henceforth called the previous invention, a light screening method was proposed to alleviate this problem for non round items (like windows and blinds), and to go beyond the uniform transmission capability of prior art items. The previous invention describes how preselected light and dark geometrical patterns (like consecutive dark and light strips and checkerboard patterns) could be realized in two or more overlapping polarized panels.

The essential feature in the previous invention is that each panel is comprised of polarizer elemental areas each having preselected shape and direction of polarizations different from the adjacent ones. One essential advantage of this method over its prior art is in its ability to create aesthetically appealing light and dark patterns under the displacement of one or both overlapping panels. The patterns result because of the overlapping of elemental areas which have different directions of polarization. These polarized panels, which are comprised of elemental areas of variable direction of polarizations, have piecewise variable transmissivity capability. Various patterns appear because of translation and, therefore, this method is ideal for non round items since no rotation is required to achieve light screening effects.

BRIEF DESCRIPTION OF THE DRAWINGS

FIG. 1 shows an explosion drawing of the simplest essential components of this invention. This structure includes two flat rectangular polarizer sheets (10a and 10b) with the relative angle between the two polarization directions (arrows) chosen as 90 degrees (minimum transmission). Each polarizer sheet has attached to its surface a series of parallel rectangular clear and colorless filters. Filter 11a and 11b (12a and 12b) are attached respectively to the sheet polarizer 10a and 10b. The filtering sequence order on polarizer 10a (10b) is 11a, 12a, 11a, 12a (11b, 12b, 11b, 12b) and so on.

OBJECT

Figure 1:
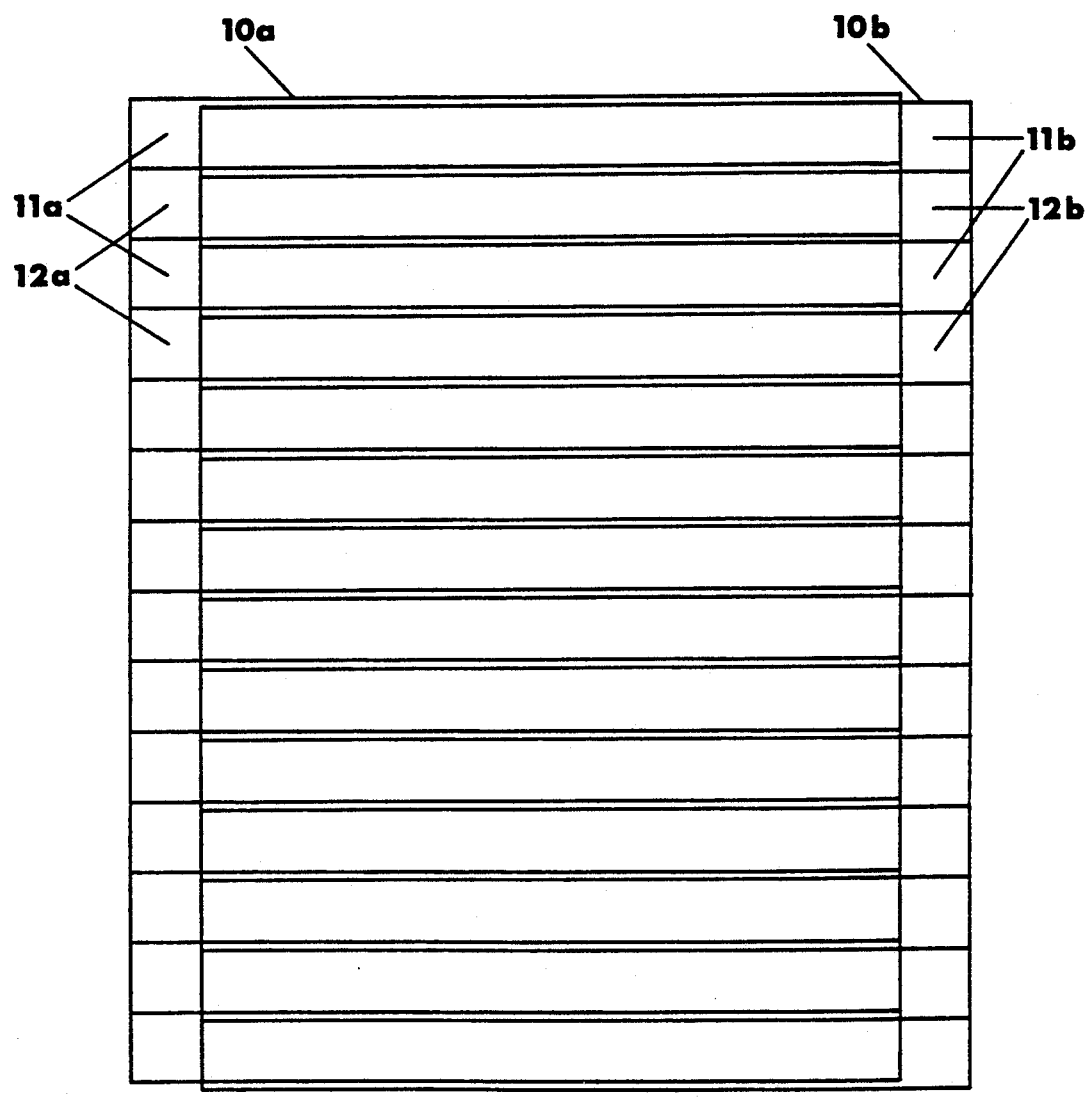

An essential requirement of the previous invention is that the variably polarized elemental areas, producing the variable transmissivity panels, must be made from polarizer materials. Another requirement is that the polarizer panels have to be physically displaced with respect to one another to create light and dark patterns. Furthermore, the invention itself has no capability of inducing multicolored patterns. The color appearing in the previous invention is simply the color (or darken color) of the polarizer sheets which are used to make the panels.

In this invention we introduce a different method to achieve various light and dark and multicolored patterns that can be used to make new types of patterned windows, blinds, shutters, shades, skylights and other utility items of both round and non round geometry. The panels used in this invention are entire sheets of polarizers and are not comprised of elemental areas of variable direction of polarization, as is required in the previous invention. In principle, there is also no need to translate the polarizer sheets over the each others as was required in the previous invention. It turns out, however, that the direct translation of the polarizer sheets is the simplest option for this invention. Finally, the optical means of this invention which produce multicolored patterns could also be easily applied to the items of the previous invention.

BACKGROUND

It is known in the field of optics that certain sheet (or sheets) of some transparent materials (filters) when placed between two test polarizer sheets, exposed to an incident visible light of arbitrary polarization, have the capability to modify the intensity and polarization, and sometimes the color of the emerging light. The degree of light transmission through the combined system and the dominant colors which would result could be varied by varying the mutual orientations of the polarizers and the thickness, composition, and orientation of the transparent filter. The physics involved and the explanation that follows with each optical label (filters, retardation plates, depolarizers...), thickness, optical anisotropy etc., though complex, fit within the conventional optics and are not of an immediate interest to this invention. Suffices to say that all the optical phenomena of interest in this invention are, in principle, explainable by the combination of the Maxwell's equation and the knowledge of the atomic properties (optical properties of materials) of the inserted and the polarizer materials.

This invention utilizes established, but perhaps not widely used, optical effects for the purpose of making optically appealing light screening utility items like windows, blinds and other devices. The filter materials that cause visual patterns and colors in these items are too numerous to be detailed here. Although using one particular filter as opposed to another will modify to some extent the visual color effects of these items, the general methodology of this invention is not dependent on the specifics of the filter materials.

DESCRIPTION

The filters in FIG. 1 are assumed to be colorless and clear (cut, for simplicity, to rectangular shapes). They are attached on the surface of two overlapping polarizer sheets at the minimum transmission mode. Most details of this invention are unchanged if two polarizer sheets are used in the maximal transmission mode. Although the latter case is not discussed, this invention also covers this case as well.

A good filter is the one capable of changing the emerging light intensity substantially when rotated between polarizer sheets. There are many filter to choose from. However, not all clear or diffuse transparent thin sheets of plastics materials are suitable filters. Some of these materials are not capable of causing maximum to minimum transmission changes when rotated between two polarizer sheets. Others may induce only a partial amount of light intensity changes under rotation. In spite of this, there are sufficient number of plastics materials that could be used as candidate filters for inducing substantial light transmission changes under rotation between polarizer sheets. The word plastics in this invention includes also reinforced, composite plastics, and transparent resins as well as plastics that would be made in the future.

To describe the essentials of this invention we will choose clear, almost non absorbing, thin plastic sheets. Many of these plastics are commonly used for wrapping certain commercial and food items. In particular, a good generic plastics was found among plastic sheets that are used for wrapping cigarette packs. Good plastics are, however, too numerous to be detailed here in terms of individual chemical compositions and physical properties. These materials would be called sample 1 to represent all good achromatic filters.

We have observed that the best candidate thin plastics are those that have high resistance to stretching, like paper. These materials are ideal for the purpose of this invention because by placing a single plastic sheet of sample 1 between two polarizers, exposed to neutral light, the emerging light intensity can be varied (by rotating the filter) from a maximum (light) to a minimun (dark) in a continuous manner. The rotation does not induce any color. However, two or more of such filters when placed between polarizers could generate various colors under rotation.

A search was conducted to find thin sheets of transparent plastics that could cause colors under rotation between two polarizers. By sampling varieties of commercially available plastic sheets, the applicant has found a number of these plastics that were able to generate high quality colors. However, my search is not complete, given the varieties of generic plastics, and, therefore, no listing shall be provided. Suffices to say that some of the best plastics found in this search were from certain commercially available photo albums. These clear sheets are used to protect pictures. Their transparent quality do not distort the details of a picture and they are easily attached and removed from the adhesive that holds the pictures in the album.

We have observed that the color spectrum of these filters are generally functions of the relative orientations of the filters with respect to the polarizer sheets, and the viewing angle of the observer. The latter properties may be due to scattering properties of these filters at various angles and the optical light path through the filters at different incident angles. These color inducing filter materials are collectively called sample 2. As discussed in the next section, these materials are used as the optical means of this invention to convert light and dark patterns into colored patterns in polarizer panels.

To optimize the light transmission range of the rectangular filters of FIG. 1, which cause light and dark patterns, we proceed as follows: first we start with a candidate filter and place it between two rectangular shape polarizer sheets at minimum transmission. Then rotate the candidate filter sheet until the same transmission is obtained as the host polarizers (in this case minimum transmission). This filter position provides a reference for making other cuts. For example, one can choose to cut rectangular shape strips from a candidate plastic sheet at an angle of 45 degrees with respect to the reference position. These filters when placed between polarizer sheets and positioned parallel to either the polarizer width or side, cause the emerging light intensity to be maximal (i.e., maximum transmission). Likewise, rectangles causing minimal transmission would have their axis 45 degrees rotated with respect to those causing maximum light transmission.

All filters denoted by 12a (12b) in FIG. 1 have their optical axis rotated by 45 degrees with respect to those denoted by 11a (11b). Filters having the same orientations (those labelled with the same number) are chosen such that when they overlap they cause the overall structure to transmit light maximally. Thus, the system in FIG. 1 will be perceived as clear and transparent. By translating one polarizer sheet downward (or upward) by an amount equal to half of the rectangular width, overlapping occurs between two filters that have a 45 degrees difference in their molecular orientation. The overlapped regions would then appear as dark strips, where each dark strip width is half of the original rectangular width.

It is obvious that an additional translation of another half a rectangular width downward or upward will result in a panel that is overall dark (minimum transmission). The method just described can provide the necessary basis for optically creating light screening blinds, windows, shades and other light screening items. A prototype optical window was built by the inventor following the method described in this invention. The prototype was able to produce all the expected patterns and colors anticipated by the method.

There is a simpler way to realize the same type of structure as the one described in FIG. 1 but with the added advantage that the number of filters can be reduced by half. In this realization, the rectangular filters attached to each polarizer panel, are chosen such that when two of these filters overlap the overlapped region will appear dark. Even though each filter alone causes maximum light transmission when placed suitably between test polarizers at minimum transmission, filters causing maximal transmission are not necessarily identical in their molecular orientations vis a vis the polarizers sheets. We denote the two types of filters by w1 and w2 with the requirement that their overlapped regions must appear dark.

The filters on the polarizer panels of this realization are attached in the following manner: we first place a w1 type filter on the surface of the rectangular polarizer sheet 10a. Then, we leave blank an area equal to the size of a strip on the surface of the polarizer below the first w1 filter. Then, next to the blank polarizer strip a second w1 type filter is attached and the sequence is repeated until the polarizer's surface is covered.

For the second polarizer sheet (10b), the first strip is blank and the rest is the repetition of the previous procedure but with w2 type filters instead. Thus, the sequence of strips on polarizer 10a: w1 filter, blank filter, w1 filter, blank filter and so on. Likewise, for polarizer 10b the filtering sequence is: blank filter, w2 filter, blank filter, w2 filter and so on. As seen, this method requires half of the amount of filters that was required for the structure discussed in FIG. 1.

The light screening device described in FIG. 1 that lead to stripped patterns can be easily extended to any other geometrical light and dark patterns. For example, in another embodiment of this invention the strip filters on each polarizer sheet (10a and 10b) are replaced by a sequence of row and column adjacent squares such that each square, causing individually maximal transmission, is positioned next to a square that causes minimal light transmission.

Figure 2:
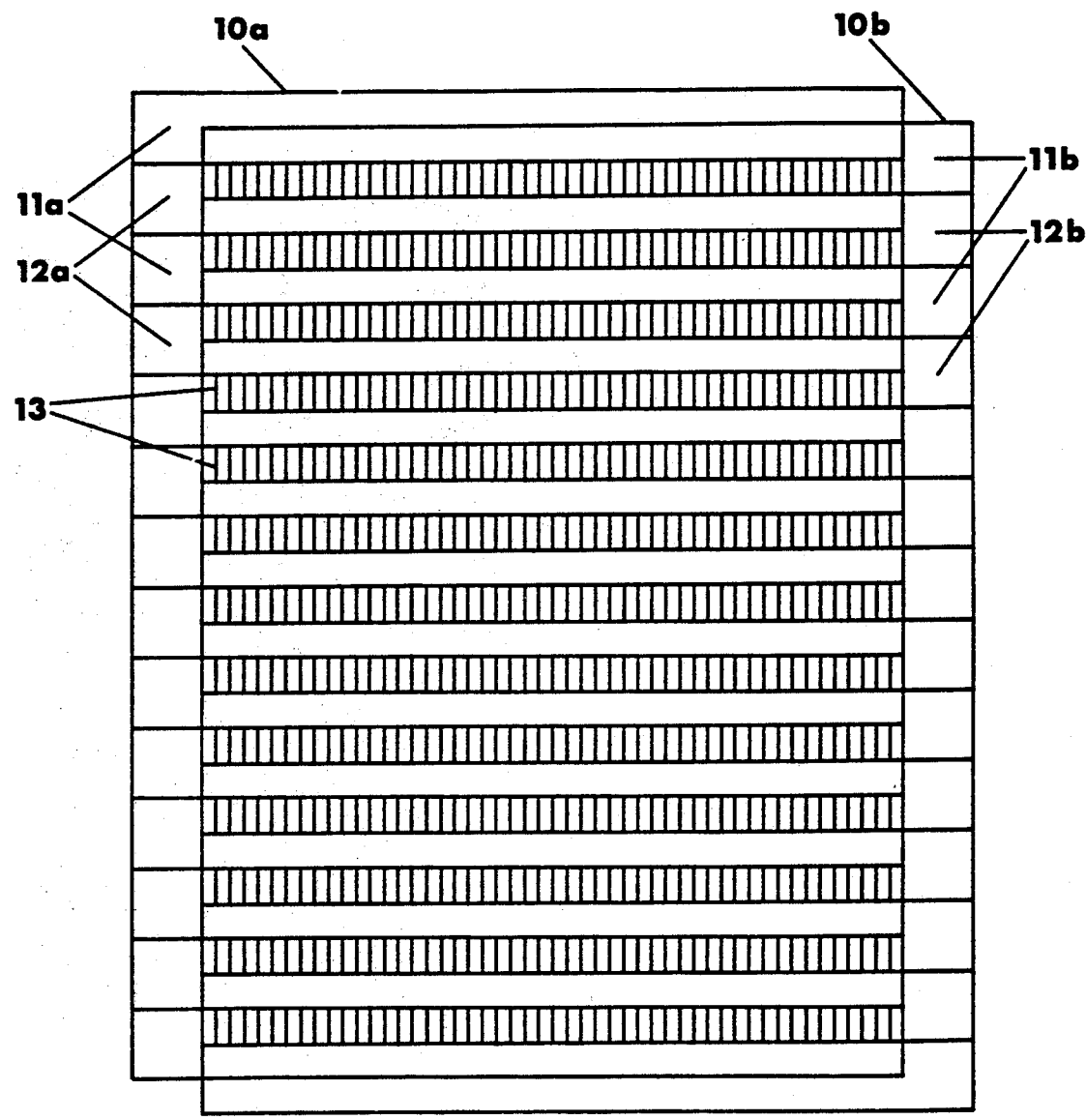
FIG. 2 shows the same arrangement as FIG. 1 with a downward translation of polarizer 10b by an amount equal to half of the rectangular filter width. The shaded rectangular areas (13) are minimum transmission regions (dark) which result from the overlapping of any filter 11b (12b) with any filter 12a (11a). The overall structure appears as a series of consecutive light and dark horizontal strips, similar to blinds.

The above system, which is still composed of two entire sheets of polarizers, as 10a and 10b in FIG. 1, is capable of generating: (1) equal size horizontal light and dark consecutive strips, as in FIG. 2, if 10b is displaced downward (or upward) from the neutral position (maximum transmissivity) by half a square width, (2) equal size vertical light and dark strips if 10b is displaced half a square sideways to the neutral position, (3) checkerboard light and dark patterns, if 10b is displaced simultaneously half a square width downward (or upward) and then half a square width sideways. The system just described is capable of creating also other aesthetically appealing visual patterns by performing simultaneously an arbitrary amount of translation downward (or upward) and then sideways.

The filter elements are secured directly on the polarizer sheets. This can be done, for example, by using high quality transparent optical adhesive or by means of an electrostatic attraction. The necessary translations have to be performed by one or both polarizer sheets. On the other hand, it is also possible to keep the polarizer sheets fixed and have the same type of light screening devices as before. This can be done by placing all the filter elements on two or more overlapping clear and transparent panels (like glass or optically neutral acrylic sheets) and then place the transparent panels between the two polarizer sheets. All the necessary translations are then performed by the transparent panels only.

The patterns of light transmission through the combined system are dictated by the combination of the geometrical shapes of the filters, their orientations vis a vis the polarizer sheets and, finally, the directions and the amount of translations involved.

INDUCED COLORED PATTERNS USING PLASTIC FILTERS

The light screening systems discribed thus far are the basic structures needed for making optical blinds, windows and other light screening devices. For example, all are needed to complete the making of windows and blinds are adequately designed frames and supports that could make the needed panel translations possible after securing the light screening systems in them. However, the design of these frames and supports, and other possible engineering details such as means to prevent degradation of filters and polarizers, fall into the category of conventional techniques and are not discussed further in this invention. It is, however, obvious that these panels must be supplemented by adequate frames and supports for various applications.

The light screening systems discussed previously are capable of generating in a controlable manner predesigned multi patterns of light and dark patterns by applying various amounts of translations on one or more overlapping optically active panel. Although these systems are complete in terms of performance and the purpose in which they were created for, the light screening items produced in this way are not capable of generating colored patterns, other than the usual light and dark patterns. The creation of colors by a simple optical means can, in many instances, be a desirable feature for enhancing the aesthetical values of those products.

There are several optical ways of generating colors in the previous system by using plastic material filters. Although below only four simple ways are described, ways not discussed in below follow the same basic technique as those described in below. All means relevant to this invention involve plastic filters that are placed between polarizer sheets. In this invention the basic tint of all polarizers is chosen as smoke, but the use of other color polarizers will not alter the general methodology. The four ways of optically generating colors are:

(1) by inserting one or more color inducing filter sheet, belonging to sample 1 or 2, between the two optically active panels (e.g., the two panels of FIG. 1 where each panel is made of an entire polarizer sheet and its attached achromatic filters).

Figure 3:
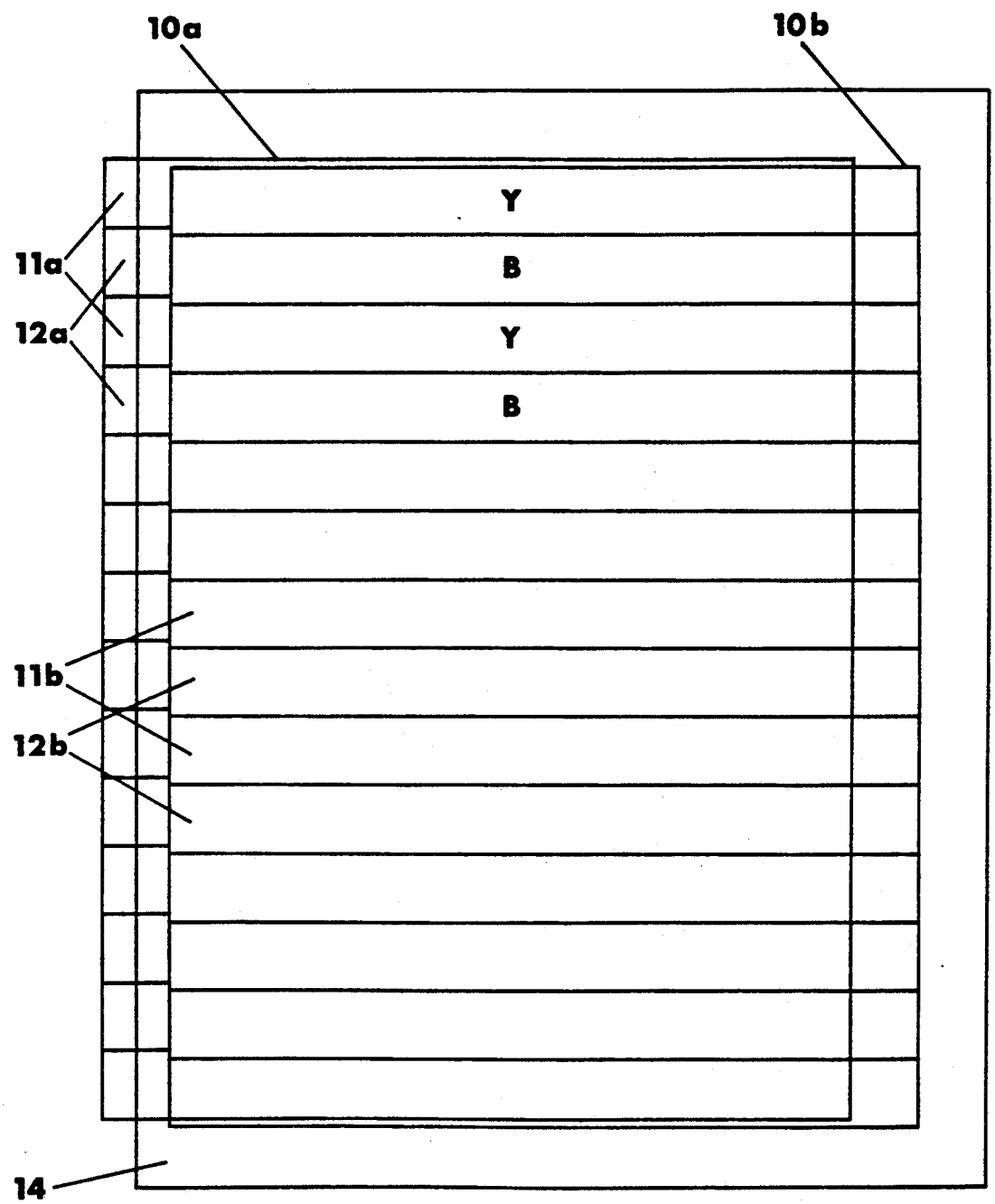
FIG. 3 shows diagramatically an embodiment of this invention capable of inducing colored patterns in FIG. 1. This drawing includes only one color inducing filter (14). Begining at the top, the colored strips sequence are yellow (y) and blue (b) respectively.

If a single filter is inserted between the panels, having a suitable orientation in order to induce specific colors, then it is observed that the light and dark patterns-irrespective of their shapes (like strips or checkerboard)-are not generally altered in either shape or size. Only that the light, and most often the dark, patterns are instead converted to colored patterns. FIG. 3 shows the color sequence in FIG. 1 after placing a single color inducing filter between the two polarizers. In most of our observations, at normal viewing angle to the panels, we have found that, depending on the filter's thickness, the dominant colors are most likely orange and blue or rosy pink and green. If a second filter is inserted between polarizers, then the induced colors are modified to another set of colors. Depending on the orientation of the second sheet, colors could be degraded or reinforced under rotation of the filters.

(2) An interesting case occurs when a third polarizer sheet (or more than one polarizer sheet) is added along with an additional filter(s) sheet to the structure described in option 1. Overlapping the latter polarizer/filter sheet with the colored light screening panels of the first option will cause the combined system to look like an appealing multicolored and multipatterned art or stained glass. However, there is an additional novelty here which is absent in traditional fixed colored stained glasses and that is as the observer's angle of view is varied the perceived colors of the optically formed stained glass also vary. This kind of structure and the like can be used as the basis for making any type of optically induced art and stained glass at a much lower cost than the traditional ones.

(3) Another option to make colored patterned panels is to add on each panel one or more filter cuts to the already existing achromatic filters that are responsible for inducing light and dark patterns. The added filter cuts do not have to be necessarily the same for each panel.

In the specific embodiment of this invention described in FIG. 1, the filter cuts were chosen as rectangles. By adding one or more rectangular color inducing filters to the previous series of achromatic rectangular filters one is able to generate various colored patterns upon translations of one or both overlapping panels.

Art and stained glass effects can also be realized in items made by option 3 by adding one more polarizer sheet and its filter to the structure. However, in this option there are certain requirements on the added color inducing filters when overlap with the already existing achromatic filters. These requirements come about because in most applications it is desirable to have a light screening structure that is capable to turn completely dark (minimum transmission) under a suitable translation of one or more of its panels. The added filters even though capable of producing certain colored patterns must not destroy the minimum transmissivity capability of these devices. This is essential if the optical blinds based on this option are to be comparable to the conventional blinds that are capable of screening large amount of light.

(4) It is possible to combine the structural details of the last three options altogether for the case of two or three polarizers. This combination can engender even more varieties of colors than the previous options.

The choice of a particular option is a matter which must be decided based on what kind of light screening items are to be manufactured following the methodologies described in this invention. The optimum choice will depend on the expected performance economy, design and the applicability of each individual item.

The color inducing filters of this invention could also be applied to items that are round. An example typifying such devices are eye and sunglasses which use overlapping round polarizers to screen the impinging light. Applying two thin and perfectly clear plastics as the means of generating various colors, when rotated between polarizers, can be an enhancement for these items.

The user of such glasses has the option of screening light in both colorless and color mode. In the colorless mode, the overlapping filters are oriented in such a position that light transmission through these glasses is maximal prior to any rotation (64% of light is roughly transmitted in many commercial single sheet polarizer). If one of the overlapping polarizers is now rotated with respect to the fixed one, then the user is able to vary the amount of light he wishes to receive in a continuous way, from the extreme maximum to the extreme minimum (dark), without perceiving any color. In the colorless mode the filters must rotate with the rotating polarizer.

The user has also the option of seeing his surroundings in certain selective colors. To induce colors, the glass is set at the maximal transmission mode and then one or both filters are rotated without rotating the round polarizers. A mechanical means of conventional type can be easily incorporated into the glass frame to allow various independent rotations of the polarizers and the filters. The filter rotation, in turn, causes uniform changes in the perceived colors. If the plastic filters are chosen appropriately, one is able, at some angle of rotation, to produce the same color effect as the common ski masks. The capability to change the perceived light intensity and the perceived colors are features of a single eye or sunglass that are made possible by this invention.

There exist also a simpler version of the above sunglass. In the simpler version a single color inducing filter is used between two round polarizers with the filter now directly attached to one of the polarizers. This structure is able to produce colors under rotation but the maximum transmission mode in these types of eye or sunglasses is not completely colorless. More precisely, a faint color residue remains even in the maximal transmission mode. The color residue is, however, quite faint in most plastic materials that I have tested. It is, nonetheless, quite conceivable that there exist other suitable color inducing filters that were not tested.

The essential method behind this invention was to use various predesigned shape thin transparent plastic filters in light screening items which employ polarizers to produce light and dark and colored patterns. This method can equally benefit all panels and items of the previous invention. The essential components of that invention, as described in the prior art section, are panels composed of polarizer elemental areas with each area having different directions of polarizations. Light and dark visual patterns emerge by means of displacing one or more overlapping panels.

A simple insertion of a color inducing plastic filter between panels of the previous invention is sufficient to convert the light and dark patterns into colored ones. Likewise, as in our invention, stained and art glass visual effects could be also created in the items of the previous invention by overlapping another polarizer sheet accompanied by one (or more) additional filter(s) with the existing panels of that invention. As in this invention, the color inducing filters are inserted between the polarizer panels at specific orientations. The latter creates predesigned colored patterns for the items of that invention. The added polarizer sheet can be taken as a single sheet with no elemental areas on it, similar to this invention.

The methodology of this invention is not restricted to flat panels. These methods apply equally well to items which have non flat or curved polarizer panels (like skylights). Likewise, there are no restrictions for using the methods of this invention to round items. In these items, the appearance of patterns is again due to translation of two or more overlapping polarizer panels.

It is also possible to simply add one or more transparent diffusing plastic sheets to the light screening structures of this or the previous invention. Equally, it is possible to require some of the achromatic or color inducing filters to be of diffuse type. The diffuse filters do not change the general capabilities of this invention insofar as generating light and dark and colored patterns. Their use may be beneficial to cases where more privacy is desirable. Diffuse filters could be of particular use in art and stained glass applications.

Most light screening structures described in this invention remain operational under small scale rotation of the panels which are also capable of translations. Small scale rotations, for example, could be usually tolarated in non round windows because their frames have in most cases some additional spaces that could accommodate small rotations of one or all existing polarizer panels. Equally possible, the rotation could be performed directly by the achromatic and color inducing filters that are inserted between the polarizer sheets. Small scale rotations of only few degrees are often sufficient to degrade or to enforce uniformly the light and dark and the colored patterns of the light screening items described in this invention.

I have found that most achromatic filters tested have the capability to modify the emerging light intensity rather quickly under small changes of orientation. To elaborate more, take two overlapping test polarizer sheets at minimum transmission and place a single achromatic filter between the two polarizers and rotate it until a position is reached where the light transmission through the combined system of polarizers and the filter is again minimal. The use of such filters provides certain advantages because under only few degrees of filter rotation, the system is capable to go from the previous state of minimum transmission to a state of maximum transmission.

If such a drastic light intensity change were to be accomplished by simple rotation of the polarizers alone, it would have required a substantial amount of angular rotation; a feature that is not suited for non round panels.

The use of achromatic filters allow substantial variations of the emerging light intensity in a uniform manner under only few degrees of rotation for round and non round items whose polarizer panels are capable of overlapping. By placing these plastic filters between polarizer sheets, one can built simplest kind of patternless light screening utility items that are capable of changing uniformly the emerging light intensity from a maximum to a minimum under small rotations. As usual, colors could be generated in these types of panels by simply placing one or more color inducing plastic filters between the panels.

Finally, although the plastic materials tested for this invention were almost all thin, the methodology of this invention also covers plastic sheets that are diffuse and not necessarily thin. Thickness plays an important role in determining the changes in both emerging light intensity and the optically induced colors. The word plastic sheets or plastic filters in the claims in below is meant to cover both thin and not thin plastics.

Having described the essentials of this invention, I wish to claim:

1. A polarizing optical panel comprising:
   at least two polarizing sheets each attached to an optically neutral substrate wherein the direction of polarization of each said sheet is arranged at an angle of ninety degrees with respect to another of said polarizing sheets, and
   a plurality of optically clear retarding filter wave plate elements superimposed over each said polarizing sheet in the form of alternating parallel stripes,
   wherein at least one of said polarizing sheets can be translated with respect to another of said polarizing sheets in order to create induced intensity and color variations.

2. A method of making a polarizing optical panel comprising:
   forming at least two crossed-polarized polarizing sheets,
   attaching said polarizing sheets by static electricity to optically neutral substrates,
   subsequently attaching to a surface of each said polarizing sheet a plurality of optically clear retarding plastic filter wave plate elements in the form of alternating parallel stripes,
   whereby at least one of said polarizing sheets can be translated with respect to another of said polarizing sheets in order to create induced intensity and color variations.

* * * * *